Feb. 13, 1962   A. M. BROWN ETAL   3,020,834
STAMPING MECHANISM
Filed May 22, 1958   8 Sheets-Sheet 1

FIG. 1

INVENTORS
ALVIN M. BROWN
JOHN S. AYERS
ROBERT L. SHIELDS
JOHN M. MALONEY
T. JACOB KMIECIK
BY P.C.Kuhnert
Attorney Feb. 13, 1962  A. M. BROWN ETAL  3,020,834
STAMPING MECHANISM
Filed May 22, 1958  8 Sheets-Sheet 3

FIG. 3

INVENTORS
ALVIN M. BROWN
JOHN S. AYERS
ROBERT L. SHIELDS
JOHN M. MALONEY
T. JACOB KMIECIK
BY
*PCKuhnert*
Attorney Feb. 13, 1962    A. M. BROWN ETAL    3,020,834
STAMPING MECHANISM
Filed May 22, 1958    8 Sheets-Sheet 4

INVENTORS
ALVIN M. BROWN
JOHN S. AYERS
ROBERT L. SHIELDS
JOHN M. MALONEY
T. JACOB KMIECIK

BY *P.C. Kuhnert*
   *Attorney*

Feb. 13, 1962　　A. M. BROWN ETAL　　3,020,834
STAMPING MECHANISM
Filed May 22, 1958　　8 Sheets-Sheet 5

FIG. 6

INVENTORS
ALVIN M. BROWN
JOHN S. AYERS
ROBERT L. SHIELDS
JOHN M. MALONEY
T. JACOB KMIECIK

BY *H. Kuhnert*
*Attorney*

Feb. 13, 1962   A. M. BROWN ETAL   3,020,834
STAMPING MECHANISM
Filed May 22, 1958   8 Sheets-Sheet 6

INVENTORS
ALVIN M. BROWN
JOHN S. AYERS
ROBERT L. SHIELDS
JOHN M. MALONEY
T. JACOB KMIECIK
BY
Attorney

FIG. 9

INVENTORS
ALVIN M. BROWN
JOHN S. AYERS
ROBERT L. SHIELDS
JOHN M. MALONEY
T. JACOB KMIECIK

3,020,834
STAMPING MECHANISM

Alvin M. Brown, Penn Township, Allegheny County, John S. Ayers, Scott Township, Allegheny County, Robert L. Shields, Brentwood Boro, John M. Maloney, Munhall Boro, and Thaddeus Jacob Kmiecik, Bethel Park Boro, Pa., assignors to Jas. H. Matthews & Co., Pittsburgh, Pa., a corporation of Pennsylvania
Filed May 22, 1958, Ser. No. 737,041
7 Claims. (Cl. 101—4)

This invention relates to stamping tools and more particularly to a stamping mechanism for making a marking impression on steel billets, slabs, blooms, or the like, or on hard composition objects, with a particular character as the object proceeds rapidly along a production line.

The principal object of the invention is to provide a stamping mechanism for quickly changing the markings or characters on the stamping tool between rapidly repeated stamping operations.

Another principal object of the invention is to provide a stamping mechanism in which the character changing mechanism will be removed from the stamping mechanism so that it will not be subjected to the shock incurred when the associated stamp is rammed against the object to be stamped and is consequently more durable.

Another object is to provide a stamping mechanism which will produce a clear, even and clean-cut impression on a plane surface of a hard object formed of metal, composition, or the like even though the surface is slightly out of square.

Other objects and advantages will become apparent during the course of the following description.

To attain these objects there is provided, in the preferred embodiment of the invention, a changeable stamping head having a plurality of dies rotatably mounted in a carrying frame. Each die bears a number of stamping characters arranged about its periphery, any one of which may be revolved into the stamping face. The characters to be brought into said stamping face for the next stamping operation are selected by setting and operating an indexing, or conditioning mechanism, when said stamping head is out of its stamping position and in operative engagement with the wheels of the mechanism for revolving the dies so as to bring the desired combination of characters into the stamping face for the next stamping operation. The stamping head may then be swung by parallel arms away from the indexing mechanism in a looping motion and with rapidly increasing momentum into the end of a billet or other hard object. By reason of the carrying arms being parallel, the stamping face is always in a horizontal position so that it will be on the square with the straight end of a billet as long as the billet is within striking distance. The stamping head is mounted to the carrying arms by means of a resiliently pivoted connection carried in a resilient lost-motion mounting in a stamping frame which permits the stamping face to align itself with the end surface of a billet, which has been cut obliquely by the shears, before the ramming action takes place.

In the accompanying drawings forming a part of this specification.

As shown in the drawings, the stamping mechanism 1 comprises a stamping head 2, a stamping frame 3, a carrier frame 4, four frame actuating, fluid pressure operated motors 5, a trolley 6, a motor 7 for driving the trolley 6, and an indexing or conditioning mechanism 8. The control of this mechanism 8 is shown and described in our copending application Serial No. 765,513, filed October 6, 1958.

Figure 4:
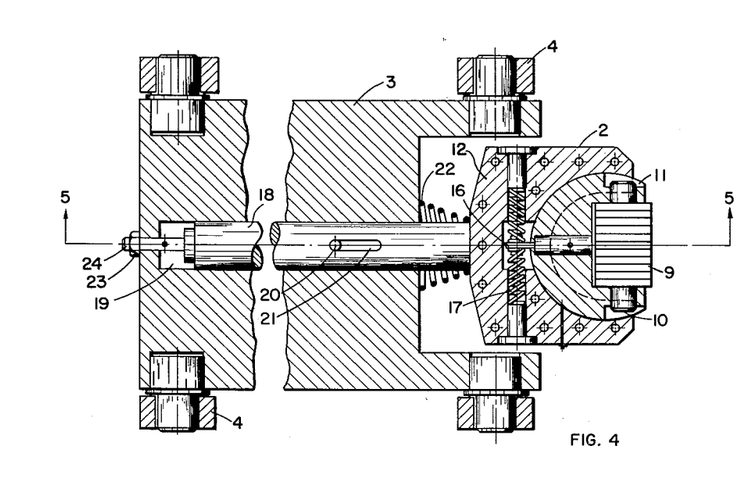
FIGURE 4 is a sectional view taken on the lines 4—4 of FIGURE 1.
Figure 5:
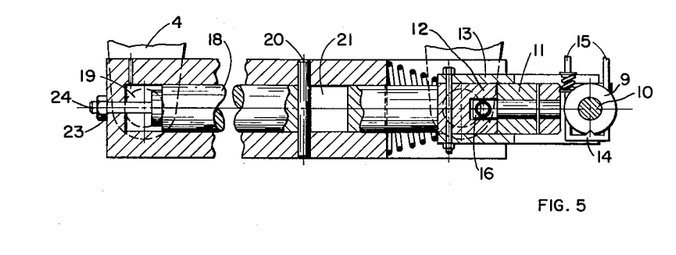
FIGURE 5 is a sectional view taken on the lines 5—5 of FIGURE 4.

Referring now to FIGURES 4 and 5, the stamping head 2 comprises a plurality of dies 9 carried on a shaft 10 mounted at each end in a head portion 11. The head portion 11 is provided, at the side opposite to the shaft 10, with a cylindrical surface which fits into a matching cylindrical surface in a socket or base portion 12 and retained therein by a pair of plates 13 bolted to the top and bottom of the portion 12. A keeper bar 14 is yieldably mounted in the outer end of the head portion 11 to prevent rotation of the dies 9 and is adapted to release the dies for rotation when a trigger 15 is depressed. As shown in FIGURE 4, a tail piece 16 secured to the cylindrical bearing side of the head portion 11 is disposed between two opposing springs 17 which are mounted horizontally in the socket portion 12 so as to urge the head portion 11 toward its centered position, in which the stamping face of the head will be square to the direction of motion of the head 2.

The stamping head 2 is slidably and yieldably disposed in a recess in the outer face of the stamping frame 3 in which it is supported by means of an integral stem 18 slidably mounted in a bore 19 in the frame 3. Inward movement of the head 2 relative to the frame 3 is limited by the end of the stem 18 engaging the inner end of the bore 19. Outward movement is limited by a pin 20, fixed in the frame 3, engaging the inner end of a slot 21 formed in the stem 18. A spring 22 interposed between the head 2 and frame 3 and encircling the stem 18 urges the head 2 outwardly at all times. Outward movement of the head may be reduced from that defined by the pin 20, by turning down an adjusting nut 23 exteriorly mounted on a reduced, threaded portion 24 of the stem 18.

Figure 1:
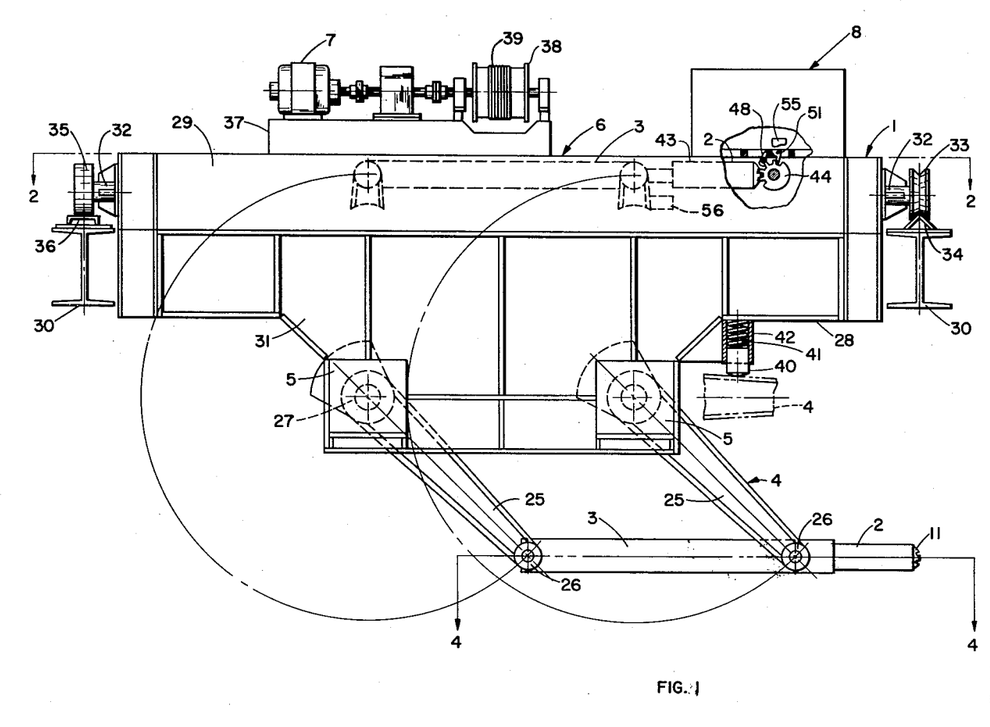
FIGURE 1 is a side elevation of a preferred embodiment of our improved stamping mechanism showing the various parts in their normal or inoperative position.
Figure 2:
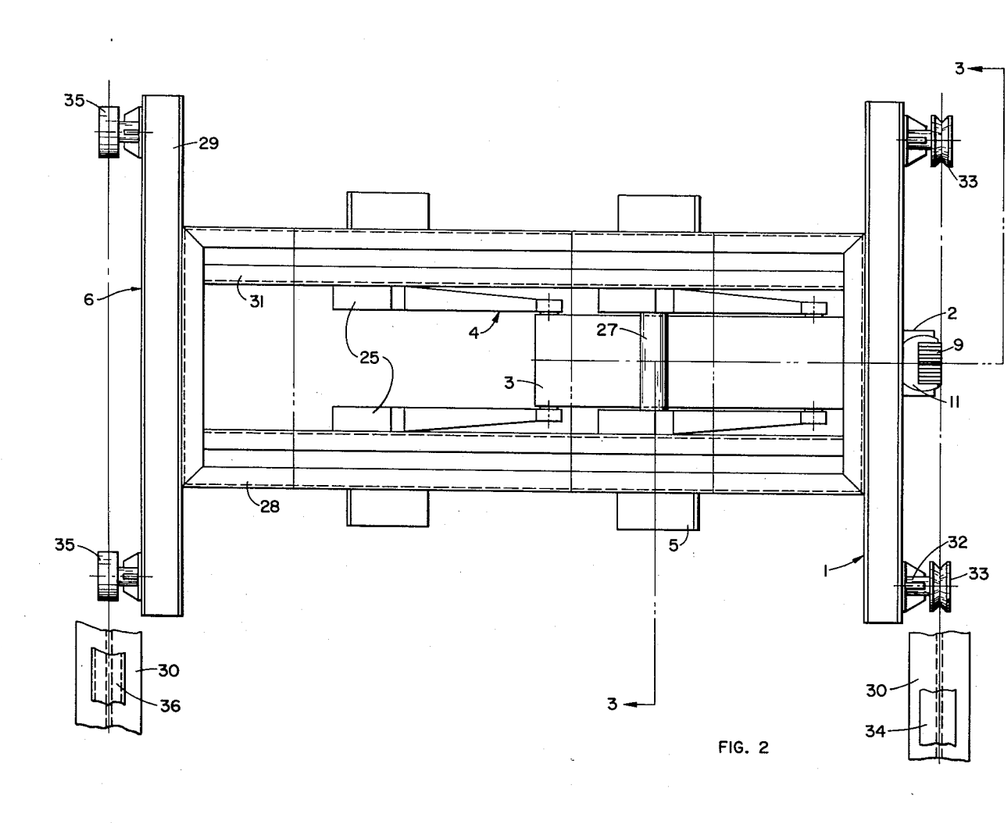
FIGURE 2 is a sectional view taken on the lines 2—2 of FIGURE 1.

As best seen in FIGURES 1 and 2, the carrier frame 4 constitutes that part of the stamping mechanism 1 which swings the stamping head 2 from an upper position, in which it is operatively engaged by the indexing mechanism 8 to be set or conditioned for the next stamping operation, to a lower position in which it stamps a billet. This carrier frame 4 comprises four arms 25 pivotally connected at the bottoms by means of pins 26 to the stamping frame 3, which also constitutes a part of the frame 4, and mounted at the top on two shafts 27 journaled in a transom 28, which is a part of the trolley 6. The points of the bottom pivotal connections of the arms 25 are located at the respective corners of the rectangular frame 3 which thus provides a pattern for the location of the four pivotal connections with the transom 28 at the top. With the pivotal connections thus located the same at both ends, the arms when actuated will produce a pantograph form of action which will maintain the stamping head 2 in a vertical plane which is always on the square, or at right angles, to the lineal direction of motion. The outer end of each of the shafts 27 is arranged to be rotated by one of the four fluid pressure operated cylinders 5.

Figure 3:
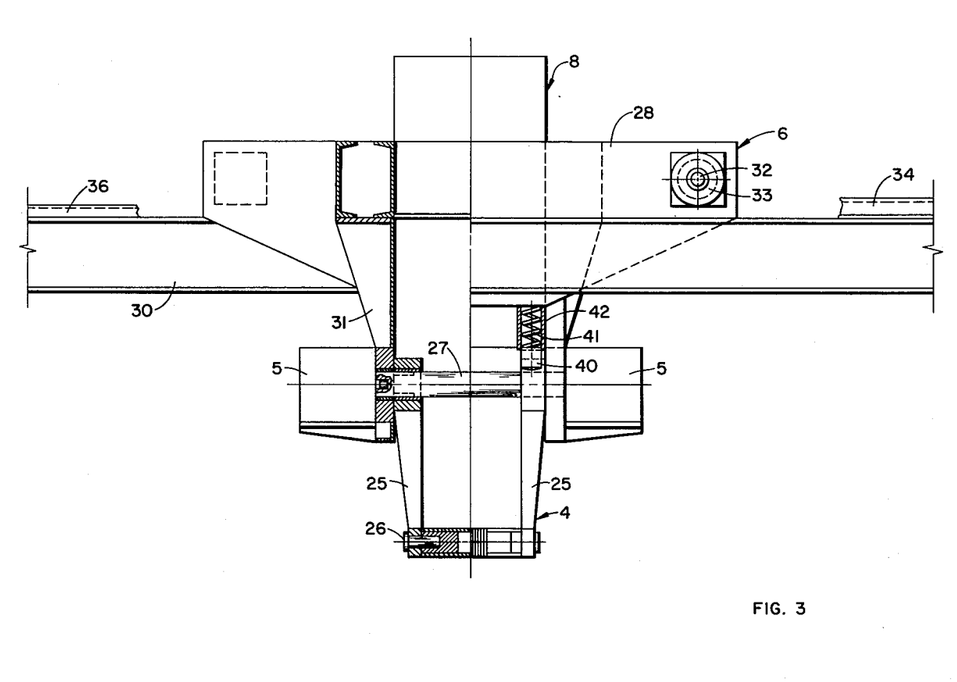
FIGURE 3 is a sectional view taken on the lines 3—3 of FIGURE 2.

The trolley 6 is provided for positioning, actuating and controlling the action of the stamping head 2 through the medium of the stamping frame 3 of the carrier frame 4. The transom 28 of the trolley 6 (FIGURES 1, 2 and 3) is a composite beam structure comprising a platform portion 29 which spans the space between two rail supporting beams 30, and an integral depending portion 31 from which the frame 4 is suspended, as previously noted. Mounted on one side of the platform portion 29 by means of rigidly attached stub shafts 32 is a pair of grooved trolley wheels 33 which fit the inverted V-shape cross section of a rail 34, supported on one of the beams 30, and guide the movement of the trolley 6. Similarly mounted on the other side is a pair of flat tread trolley wheels 35 which are adapted to ride on a flat topped rail 36 supported on the other beam 30. The motor 7 for moving the trolley 6 is mounted on a base 37 (FIGURE 1) which is supported on the platform portion 29 and makes a driving coupling with a spool 38. A cable 39 makes several turns about this spool 38 and is anchored at remote points on opposite sides of the spool so that turning of the spool in one direction will draw the trolley 6 in one direction and turning in the opposite direction will act conversely. The bottom of the depending portion 31 is provided at the stamping side with a buffer plunger 40, pressed by a spring 41, both of which are operatively mounted in a casing 42 for stopping outward movement of the frame 4 when it overtravels.

Figure 6:
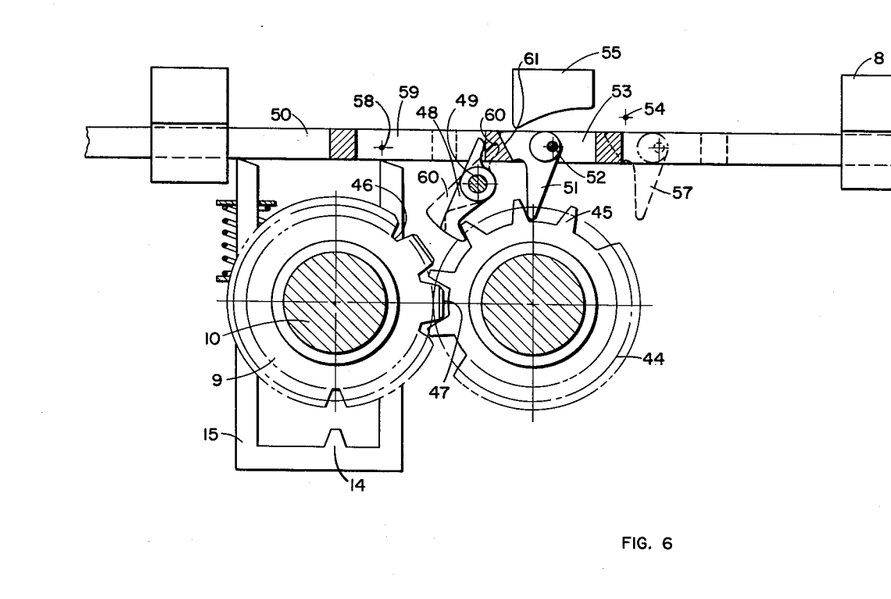
FIGURE 6 is an enlarged sectional view of the operative engagement between the indexing mechanism and the stamping mechanism.
Figure 9:
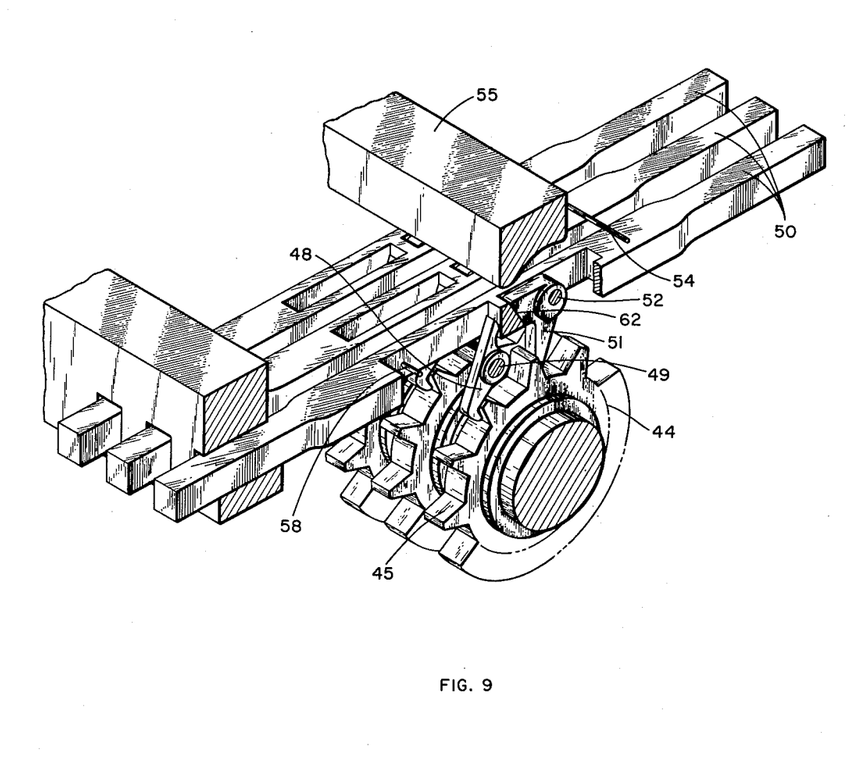

As fully described in our copending application Serial No. 765,513, the indexing mechanism 8 is remotely controlled for turning the dies 9 so that the desired numbers or characters are in the stamping face. Since the remote control means for operating the indexing mechanism 8 is not a part of this invention, only so much will be described as is necessary to a clear understanding of our invention. In FIGURES 6 and 9 an enlarged view of the pawl or ratchet means is shown, by which the mechanism 8 operates the dies 9 to the desired positions when the head is in its indexing position shown in broken lines at 43 in FIGURE 1. As shown in FIGURES 6 and 9, the mechanism for driving each die 6 comprises a ratchet wheel 44 on which the teeth 45 are spaced so as to fit into the notches 46 between characters 47 and revolve them about the shaft 10 until the proper one is in the contact area of the stamping face. A dent 48 is rockably mounted on each of a series of pins 49 anchored in the mechanism 8 and is normally held in a position to prevent rotation of each ratchet wheel 44 in a counterclockwise direction as viewed in FIGURES 6 and 9, by its associated operating bar 50 slidable in the casing of the mechanism 8 and shown in its normal position in FIGURES 6 and 9. A driving pawl 51 is rockably suspended on each of a series of pins 52 disposed in a cavity 53 in the operating bar 50 so that it is free to rock clockwise until it engages a stop pin 54 fixed in the casing of the mechanism 8. A guide 55 is formed on the casing for returning each of the pawls 51 to its operative position as the bar 50 moves toward the left hand, as viewed in FIGURES 6 and 9 thus preventing the pawl 51 from rotating clockwise out of position in response to momentum of wheel 44 and permitting the advancement of more than one tooth.

In operation, the four fluid pressure operated motors 5 will rotate the arms 25 of the carrier frame 4 in a clockwise direction about the shafts 27, as viewed in FIGURE 1. This action will carry the stamping head 2 upwardly in an arc parallel to those described by the outer ends of the arms 25 to the indexing position of the head 2 defined by contact between the arms 25 and a stop 56, and shown in broken lines at 43 in FIGURE 1. As the head portion 11 nears the mechanism 8, the stem 15 will contact the frame thereof and move the keeper bar 14 out of locking engagement with the rotary dies 9.

In this indexing position the rotary dies 9 are in mesh with the teeth 45 of the ratchet wheels 44 as best seen in FIGURE 6. The operating bar 50 may be shifted horizontally by the mechanism 8 toward the right first and then to the left, which action will rotate the associated die 9 clockwise through an angle equal to the space between two notches 46. As the bar 50 is shifted to the right, the pawl 51 will contact the adjacent tooth 45 to the right to be advanced next and will be rocked thereby in a clockwise direction as it passes over said tooth to its right-hand position shown in broken lines at 57 in FIGURE 6. At the same time a pin 58 carried in a cavity 59 in the bar 50, will contact an arm of the detent 48, which projects into said cavity, so as to rock the detent clockwise about the pin 49 and out of the path of travel of the teeth 45 to a position shown in broken lines at 60. As the bar 50 is shifted back to the left, the pawl 51 will engage the next tooth 45 after the one just previously advanced and move it to the left while rotating the wheel 44 counterclockwise. After the wheel 44 has started to rotate counterclockwise, the pin 58 will move away from the detent 48, allowing the detent to drop into the following space between two teeth 45. When the detent 48 drops into position where it engages the left-hand or front side of the tooth 45 as shown in FIGURE 6, the wheel 44 will have rotated a distance equivalent to the distance between two teeth 45. This distance will be enough to move the next character 47 into position for stamping. The pawl 51 will now be in contact with both the back of the advanced tooth 45 and the left-hand end wall 61 of the cavity 53. Thus, the wheel 44 will be prevented from rotating counterclockwise by the detent 48, engaged by wall 61 and clockwise by the pawl 51. It will be noted that when the pawl 51 engages a tooth 45 while the pawl is being shifted toward the left that, not only is it prevented from rotating counterclockwise by the wall 61, but, after the upper end of pawl 51 passes beneath the bottom edge of the guide 55, the pawl cannot rotate clockwise to permit a second tooth 45 to advance on the same return stroke of the bar 50. There is thus a double precaution, by reason of guide 55 and detent 48, against overtravel of the ratchet, which might occur as a result of the momentum of the wheel 44 when the bar 50 is reciprocated rapidly. This reciprocating motion of the bar 50 will continue until the desired character 47 is rotated onto the stamping area of the stamping head 2, as preselected from a remote station where the character to be stamped may be selected by the operator and the character already in position is indicated to the operator. After all the dies 9 have been rotated into their desired positions by the reciprocating motion of the operating bars 50, the stamping mechanism 1 is conditioned for the stamping operation.

To effect the stamping operation the motors 5 are operated to rotate the arms 25 in a counterclockwise direction about the shafts 27. This action will cause the stamping head 2 to swing back in the same arcuate path described above. As the head portion 11 leaves the indexing mechanism, the spring-pressed stem 15 will move upwardly, carrying the keeper bar 14 into locking engagement with the dies 9. The return, however, will be much more rapid because of the action of gravity. Due to the pantograph form of action of the frame 4 previously described, the head 2 will always be vertical and on the square with the lineal direction of motion of the frames 3 and 4. The face of the head 2 will, therefore, be substantially parallel to the end face of a billet, slab, bloom, or the like, to be stamped. After the dies 9 meet the end face of the billet, the stamping frame 3 will continue to move toward the billet at a rapid rate while compressing the spring 22, thus providing a resilient, lost-motion connection between the frame 3 and the head 2. When the frame 3 collides with the inner end of the stamping head 2, the frame will deliver an impact derived in part from the momentum built up by the action of the motors 5 and augmented by the force of gravity. If it is desired to reduce the impact of the frame 3 on the head 2, the adjusting screw 23 may be turned inward on the threaded portion 24 of the stem 18 to reduce the travel of the frame 3 relative to the head 2 and thereby reduce the impact.

Now, if for any reason the end surface of the billet or the like and the stamping face of the head portion 11 are not parallel when they meet, the head portion 11 will turn horizontally in the stamping head 2 until the full face of the dies 9 contacts the end surface. This turning action will be opposed by one or the other of the springs 17 acting on the tailpiece 16. Thus, the impact of the frame 3 will be distributed over the entire stamping area of the collective dies 9.

From the foregoing remarks, it will be seen that this preferred embodiment of our invention provides indexing or conditioning means for setting the stamping dies in their preselected positions for the next stamping operation, which means is separate and removed from the actual stamping area so that said means cannot be subjected to injurious shock arising from the stamping action, and stamping means which in moving from the conditioning area to the stamping area builds up momentum over a relatively long travel for better impact without taking up much space, which means is self-aligning by reason of the pantograph form of action in combination with the resilient, horizontally pivotal connection between the stamping head and the impacting means, whereby the dies are in full contact with the surface to be stamped before receiving the stamping impact and thereby obtain a clean-cut stamped impression.

While we have described a preferred embodiment of our invention in which the stamping head is moved into operative engagement with the indexing mechanism, it should be understood that maintaining the stamping head stationary while moving the indexing mechanism into operative relation with said head in order to keep the indexing mechanism isolated from the shock produced by the stamping action is not beyond the contemplation or scope of this invention. Such an embodiment is shown in FIGURES 7 and 8 of the drawings.

Figure 7:
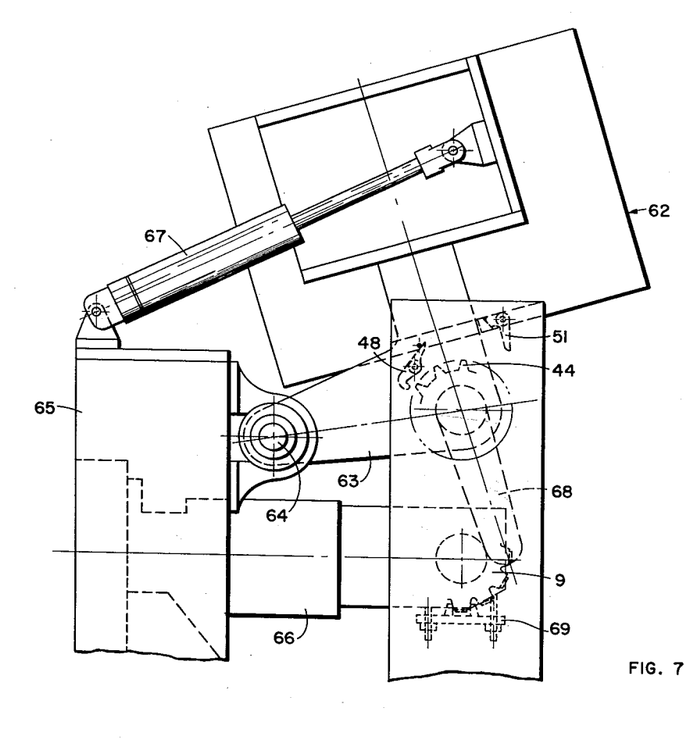
FIGURE 7 is a side elevation of another embodiment of our invention in its stamping position.
Figure 8:
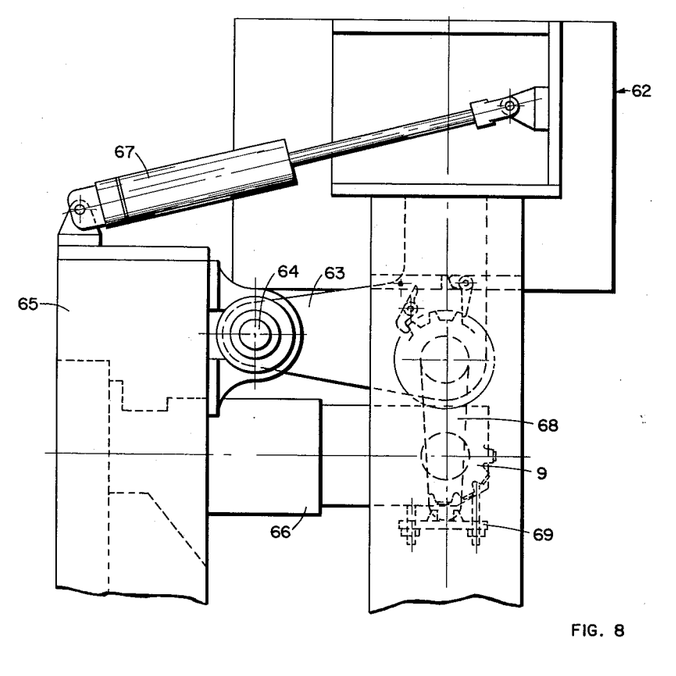
FIGURE 8 is the same elevation showing the mechanism of FIGURE 7 in indexing position; and, FIGURE 9 is an isometric view showing the multiple structure of the mechanism shown in FIG. 6, with the dies and keeper bar structure omitted for better viewing.

In FIGURES 7 and 8 a fluid pressure operated indexing mechanism 62 is pivotally mounted by means of a pair of arms 63 on a shaft 64 which is journaled in a stand 65. This stand 65 is in the form of a bridge which spans an impact mechanism 66 and is supported at floor level on its own separate base so that it is isolated from the shock vibrations arising from the stamping operation. A pair of fluid pressure cylinders 67 is pivotally connected at one end to the indexing mechanism 62 for positioning said indexing mechanism either in its retracted position, in which it is shown in FIGURE 7, or in its indexing position in which it is shown in FIGURE 8. The rotary dies 9 may be the same as those used and described in connection with the preferred embodiment shown in FIGURES 1 to 6, inclusive. The operating relation between the indexing mechanism 62 and the dies 9 may be the same as that shown in FIGURE 6, the chief difference being that the wheels 44 are disposed above the dies 9 instead of in horizontal relation to same as shown in FIGURE 6. A further difference is made in the manner of actuating the keeper bar for the dies 9. In FIGURES 7 and 8 a pair of keeper release arms 68 extends downwardly from the arms 63 for contacting a spring-pressed keeper bar 69 and actuating it downwardly out of engagement with the dies 9 as the mechanism 62 comes into indexing position. The impact mechanism may be the conventional type acting in a horizontal direction to stamp a billet. Although not shown, the same resilient, horizontally pivoting connection between the head portion 11, socket portion 12 and frame 3 of FIGURE 5 may be incorporated between the dies 9 and the impact mechanism 66 shown in FIGURES 7 and 8 to obtain the self-aligning feature described herein.

Having now described our invention, what we claim as new and desire to secure by Letters Patent is:

1. A stamping mechanism comprising, a stamping head having a stamping face adapted to be directed toward a surface to be stamped, impact means for ramming said stamping head against said surface, said stamping head including at least one die conditionable to present different characters in said face, an indexing mechanism for conditioning said head to present a selected character in said face, said indexing mechanism being isolated from said impact means and said stamping head during a stamping operation to reduce the degree of vibration received from the stamping operation, actuating means for bringing the stamping head and the indexing mechanism together in operative engagement, and pawl means for effecting said operative engagement comprising a ratchet wheel rotatably mounted in the casing of the indexing mechanism and having teeth spaced so as to fit into the spaces between the characters on said die to effect a rotative connection therewith, a wheel operating bar capable of reciprocating motion in said casing, a pawl pivotally mounted on said operating bar and extending into the path of said teeth, said pawl being rockable in one direction by movement of the bar in a certain direction to pass over the next tooth to be advanced and adapted to be blocked by a stop on the operating bar from rocking in the opposite direction past the point of making contact with the back side of the latter tooth when said bar moves in the direction opposite to said certain direction, and a detent rockably mounted in said casing and normally held by said bar in locking engagement with the front side of another tooth against movement of the first mentioned tooth in a direction away from said pawl and operable by said bar when the bar moves in said certain direction to be rocked out of said locking engagement to permit advancing rotation of said wheel and to drop said detent into the path of the oncoming tooth in response to motion of the bar opposite to said certain direction.

2. A stamping mechanism comprising, a stamping head having a stamping face adapted to be directed toward a surface to be stamped, impact means for ramming said stamping head against said surface, said stamping head including at least one die conditionable to present different characters in said face, an indexing mechanism for conditioning said head to present a selected character in said face, said indexing mechanism being isolated from said impact means and said stamping head during a stamping operation to reduce the degree of vibration received from the stamping operation, actuating means for bringing the stamping head and the indexing mechanism together in operative engagement, and pawl means for effecting said operative engagement comprising a ratchet wheel having teeth spaced so as to fit into the spaces between the characters on said die to effect a rotative connection therewith, a wheel operating bar capable of reciprocating motion in the casing of said mechanism, a pawl pivotally mounted on said operating bar and extending into the path of said teeth, said pawl being rockable in one direction by movement of the bar in a certain direction to pass over the next tooth to be advanced and adapted to be blocked by a stop fixed on the operating bar from rocking in the opposite direction past the point of making contact with the back side of the latter tooth when said bar moves in the opposite direction to said certain direction, and a detent rockably mounted in said casing and normally held by said bar in locking engagement with the front side of another tooth against movement of the first mentioned tooth in a direction away from said pawl and operable by said bar when the bar moves in said certain direction to be rocked out of said locking engagement to permit advancing rotation of said wheel and to drop said detent into the path of the oncoming tooth in response to motion of the bar opposite to said certain direction.

3. A stamping mechanism comprising, a stamping head having a stamping face adapted to be directed toward a surface to be stamped, said stamping head including at least one die conditionable to present different characters in said face, impact means for ramming said head against said surface, an indexing mechanism for conditioning said head to present a selected character in said face, actuating means for bringing the stamping head and the indexing mechanism together in operative engagement, and pawl means for effecting said operative engagement comprising a ratchet wheel having teeth spaced so as to fit into the spaces between the characters on said die to effect a rotative connection therewith, a wheel operating bar capable of reciprocating motion in the casing of said mechanism having a normal position in which said wheel is held against rotation from its normal position, a pawl pivotally mounted on said operating bar normally held by said bar in contact with the back side of a tooth just previously advanced, said pawl being rockable over the next tooth to be advanced upon movement of said bar away from its normal position and held non-rotative by said bar against the back side of the tooth to be advanced upon return movement of said bar toward its normal position, and a guide disposed in said casing immediately above the normal position of said pawl for preventing rocking of said pawl out of its normal position when said bar is in its normal position to thereby prevent the advancement of more than one tooth on said wheel for each reciprocatory cycle of said bar, said guide having an inclined surface for turning said pawl toward its normal position as the bar returns to its normal position.

4. A stamping mechanism comprising, a stamping head having a stamping face adapted to be directed toward a surface to be stamped, impact means for ramming said stamping head against said surface, said stamping head including at least one die conditionable to present different characters in said face, an indexing mechanism for conditioning said head to present a selected character in said face, actuating means for bringing the stamping head and the indexing mechanism together in operative engagement, and pawl means for effecting said operative engagement comprising a ratchet wheel having teeth spaced so as to fit into the spaces between the characters on said die to effect a rotative connection therewith, a wheel operating bar capable of reciprocating motion in the casing of said mechanism and having a normal position in which said wheel is held in its normal position, a pawl pivotally mounted on said operating bar having one arm extending into the path of said teeth adapted to rock in one direction to pass over the next tooth to be advanced only when the bar moves away from its normal position, said pawl having another arm adapted to engage a stop on said bar to prevent rocking of the pawl opposite to said one direction far enough to pass over a tooth as the bar returns to its normal position, a guide disposed in said casing immediately above the normal position of said pawl for engaging said other arm to prevent the rocking of said pawl out of its normal position when said bar is in its normal position to thereby prevent the advancement of more than one tooth on said wheel for each reciprocatory cycle of said bar, said guide having an inclined surface for engaging said other arm for thereby turning said pawl toward its normal position as the bar returns to its normal position.

5. A stamping mechanism comprising, a stamping head having a stamping face adapted to be directed toward a surface to be stamped, impact means for ramming said head against said surface, said stamping head including at least one die conditionable to present different characters in said face, an indexing mechanism for conditioning said head to present a selected character in said face, actuating means for bringing the stamping head and the indexing mechanism together in operative engagement, and pawl means for effecting said operative engagement comprising a ratchet wheel having teeth spaced so as to fit into the spaces between the characters on said die to effect a rotative connection therewith, a wheel operating bar capable of reciprocating motion in the casing of said mechanism having a normal position in which said wheel is held against rotation from its normal position, a pawl pivotally mounted on said operating bar normally held by said bar in contact with the back side of a tooth just previously advanced, said pawl being rockable over the next tooth to be advanced upon movement of the bar away from its normal position and held non-rotative by said bar against the back side of the tooth to be advanced upon return movement of said bar toward normal position, sloping guide means disposed immediately above the normal position of said pawl effective to direct said pawl toward its normal position as the bar returns to its normal position and to prevent the pawl from rocking out of its normal position when the bar is in its normal position and thereby prevent the advancement of more than one tooth on said wheel for each reciprocatory cycle of said bar, and detent means rockably mounted in the casing and normally held by said bar in blocking engagement with the front side of another tooth against movement of the first mentioned tooth away from said pawl and operable by the bar when the bar moves away from its normal position to be rocked out of said blocking engagement to permit advancement of said wheel and when the bar returns to its normal position to establish blocking engagement with the next tooth following said other tooth.

6. A billet stamping mechanism comprising a stamping head having a stamping face, said stamping face being comprised of a series of gear wheels in side-by-side relation with the peripheral faces of the gear teeth having marking characters thereon, a common shaft on which the gear wheels are rotatable, rotation of the gear wheels bringing different marking characters into position on the marking face of the marking head, a supporting block having forwardly-projecting arms in which the shaft is mounted, means for moving said head from a rest position to a stamping position, said head having latch means thereon normally interlocked with the gear wheels to hold them against rotation, the machine having an indexing head movable in an arc relative to the marking head in its rest position, a plurality of independently rotatable gears on the indexing head which may be brought into mesh with the gears of the marking head when the marking head is in rest position, means on the indexing head for moving the latch means of the marking head to a position clear of the marking gears whereby said gears may be rotated by their engagement with the gears of the indexing head, a series of separately operable ratching mechanisms on the indexing head for rotating the respective indexing gears, and means for separately operating each ratching mechanism to selectively rotate the separate gears to a predetermined position.

7. A machine for marking slabs and the like comprising a carrier movable toward and away from the work piece to be marked through a predetermined range of travel from a work-engaging position to a rest position, a marking die head mounted on the work-confronting end of the carrier for limited endwise movement in the carrier, the said marking die head comprising a series of gears in side-by-side relation and a common shaft about which the gears are rotatable, each gear tooth having a marking character on its periphery constituting one of a series of different characters, a common latching bar movable from a latching position engaging the teeth of each of said gears to a release position clear of the gear teeth, said latching bar extending crosswise of the head and being supported at each end for movement into and out of latching position, spring means for urging the latch bar into latching position, said machine having an indexing head mounted for movement in an arc toward and away from the marking die head into and out of operating position when the carrier for said head is in the rest position, said indexing head having a series of independently-rotatable gears thereon which mesh with the gears of the marking head when the indexing head is in operative position, individual means for selectively rotating each gear of the indexing head a predetermined distance, and means on the indexing head for moving the latch bar to release position and holding it in such position as long as the indexing head is in its operative position.

References Cited in the file of this patent

UNITED STATES PATENTS

| | | |
|---|---|---|
| 1,770,919 | Haupt | July 22, 1930 |
| 1,789,832 | Pannier | Jan. 2, 1931 |
| 1,850,880 | Huntzicker | Mar. 22, 1932 |
| 2,418,213 | Winterkamp | Apr. 1, 1947 |
| 2,532,540 | Dailey | Dec. 5, 1950 |
| 2,541,800 | Whittaker | Feb. 13, 1951 |
| 2,546,114 | Triplett | Mar. 20, 1951 |
| 2,641,995 | Whittaker | June 16, 1953 |
| 2,641,996 | Turner | June 16, 1953 |
| 2,818,014 | Jacquart | Dec. 31, 1957 |
| 2,899,891 | Nishigori | Aug. 18, 1959 |